(12) United States Patent
Schmiedehausen et al.

(10) Patent No.: US 11,593,378 B2
(45) Date of Patent: *Feb. 28, 2023

(54) MULTI-TENANT SYSTEM FOR PROVIDING ARBITRARY QUERY SUPPORT

(71) Applicant: ZUORA, INC., Redwood City, CA (US)

(72) Inventors: Henning Schmiedehausen, Los Altos, CA (US); Alexander Vasilevskiy, Palo Alto, CA (US)

(73) Assignee: Zuora, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,122

(22) Filed: Nov. 8, 2021

(65) Prior Publication Data

US 2022/0058197 A1    Feb. 24, 2022

Related U.S. Application Data

(63) Continuation of application No. 16/431,663, filed on Jun. 4, 2019, now Pat. No. 11,169,998.

(Continued)

(51) Int. Cl.
*G06F 16/2455* (2019.01)
*G06F 9/54* (2006.01)
(Continued)

(52) U.S. Cl.
CPC ........ *G06F 16/24554* (2019.01); *G06F 9/547* (2013.01); *G06F 16/2471* (2019.01); *G06F 16/258* (2019.01)

(58) Field of Classification Search
CPC ........... G06F 16/24554; G06F 16/2471; G06F 16/258; G06F 9/547; G06F 16/252
(Continued)

(56) References Cited

U.S. PATENT DOCUMENTS 8,639,625 B1    1/2014  Ginter et al.
2003/0191677 A1  10/2003  Akkiraju et al.
(Continued)

OTHER PUBLICATIONS

"Architecture for Managing Clouds—A White Paper from the Open Cloud Standards Incubator", Document No. DSP-IS0102, DMTF Informational, Version 1.0.0, Study Period 2013-2016, International Telecommunication Union, Geneva, Switzerland, Version 1.0.0, Jun. 18, 2010, [retrieved on Sep. 9, 2010], XP044096122, pp. 1-57.

*Primary Examiner* — Kuen S Lu
(74) *Attorney, Agent, or Firm* — Sheppard, Mullin, Richter & Hampton LLP

(57) ABSTRACT

A method comprising receiving by an arbitrary query engine a user request to perform a query associated with user data including first data and second data; partitioning the query into first and second sub-queries; providing the first sub-query to a first service provider interface (SPI) integrated into a first service configured to operate on the first data in a first datastore, the first SPI including a common interface component configured based on a uniform access specification to facilitate external communication between the arbitrary query engine and the first SPI, and the first SPI including a first service interface component configured to transform between the uniform access specification and a first service data specification and to facilitate internal data management; obtaining from the first datastore the first data formatted according to the first service data specification; transforming the first data; and providing the transformed first data to the arbitrary query engine.

17 Claims, 7 Drawing Sheets

Related U.S. Application Data

(60) Provisional application No. 62/680,575, filed on Jun. 4, 2018.

(51) Int. Cl.
*G06F 16/2458* (2019.01)
*G06F 16/25* (2019.01)

(58) Field of Classification Search
USPC ........................................................ 707/756
See application file for complete search history.

(56) References Cited

U.S. PATENT DOCUMENTS

| | | | |
|---|---|---|---|
| 2004/0239981 A1* | 12/2004 | Ducato | G06F 3/1247 358/1.15 |
| 2005/0223022 A1 | 10/2005 | Weissman et al. | |
| 2006/0235831 A1 | 10/2006 | Adinolfi et al. | |
| 2008/0162491 A1 | 7/2008 | Becker et al. | |
| 2009/0083589 A1 | 3/2009 | Fulton et al. | |
| 2010/0103837 A1 | 4/2010 | Jungck et al. | |
| 2010/0169351 A1* | 7/2010 | Kulkarni | G06F 16/248 707/759 |
| 2012/0030240 A1 | 2/2012 | Engelhardt et al. | |
| 2012/0130973 A1* | 5/2012 | Tamm | G06Q 10/00 707/706 |
| 2012/0226811 A1 | 9/2012 | Parmar et al. | |
| 2013/0097204 A1* | 4/2013 | Venkataraman | G06F 16/13 707/784 |
| 2013/0104150 A1 | 4/2013 | Rdzak et al. | |
| 2014/0006441 A1 | 1/2014 | Torman et al. | |
| 2014/0012801 A1 | 1/2014 | Soby | |
| 2014/0075239 A1 | 3/2014 | Prathipati et al. | |
| 2015/0280959 A1 | 10/2015 | Vincent | |
| 2016/0065522 A1 | 3/2016 | Vasudev et al. | |
| 2016/0267294 A1 | 9/2016 | Weissman et al. | |
| 2016/0308963 A1 | 10/2016 | Kung | |
| 2016/0316028 A1 | 10/2016 | Sengupta et al. | |
| 2017/0091231 A1 | 3/2017 | DiFranco et al. | |
| 2019/0095533 A1 | 3/2019 | Levine et al. | |
| 2019/0258636 A1* | 8/2019 | Bhattacharjee | G06F 16/2228 |

\* cited by examiner

MULTI-TENANT SYSTEM FOR PROVIDING ARBITRARY QUERY SUPPORT

CROSS-REFERENCE TO RELATED APPLICATIONS

The present application is a continuation of U.S. Nonprovisional patent application Ser. No. 16/431,663, filed Jun. 4, 2019, and entitled "Multi-Tenant System for Providing Arbitrary Query Support," now U.S. Pat. No. 11,169,998, which claims the benefit of U.S. Provisional Patent Application Ser. 62/680,575, filed Jun. 4, 2018, and entitled "Multi-Tenant System for Providing Arbitrary Query Support," which are hereby incorporated by reference herein. The present application also incorporates by reference U.S. Nonprovisional application Ser. No. 16/431,544, entitled "Systems and Methods for Providing Uniform Access in a Multi-Tenant System" filed Jun. 4, 2019, and U.S. Nonprovisional application Ser. No. 16/431,517, filed Jun. 4, 2019, entitled "Systems and Methods for Providing Error Recovery in Data Transmissions".

TECHNICAL FIELD

This disclosure pertains to multi-tenant systems. More specifically, this disclosure pertains to multi-tenant systems for providing arbitrary query support.

BACKGROUND

Under conventional approaches, data is stored in a monolithic datastore. Users may easily query the data by providing a query (e.g., an SQL query) directly to the monolithic datastore. However, such query methods are not effective for data stored in multiple datastores.

SUMMARY

A claimed solution rooted in computer technology overcomes problems specifically arising in the realm of computer technology. In various embodiments, a multi-tenant computing system (or, simply, multi-tenant system) is configured to receive a user request to perform a query. The user request may be a request initiated by a tenant (e.g., Verizon) of the multi-tenant system to obtain some or all of their tenant data. For example, the tenant data may include usage data stored in a usage datastore managed by a usage service of the multi-tenant system. The tenant data may also include subscription data stored in a subscription datastore managed by a subscription service of the multi-tenant system. The "services" described herein may be microservices, and/or the services may function and/or be defined differently. For example, the usage service may store and/or access data in one manner (e.g., as defined by a specification for the usage service), and the subscription service may store and/or access data in another manner (e.g., as defined by a specification for the subscription service). In order for the multi-tenant system to query the different services, and/or the datastores associated with those services, in a uniform manner, each of the services may include a service provider interface. In some embodiments, the multi-tenant system may provide the same service provider interface to each of the different services, and the service provider interfaces may only require minimal modification to function with a particular service. For example, the modification may include defining locations of datastores and/or data formats for the datastore (e.g., object-based, relational, flat-file).

Accordingly, modifying the service provider interface for a particular service may only include adding or modifying two or three lines of code within the service provider interface. The remaining portions of the service provider interface may be common across all of the service provider interface for the various services of the multi-tenant system.

In some embodiments, each of the service provider interfaces may be defined by the multi-tenant system according to a uniform access specification. For example, the uniform access specification may define a format for data output from services (e.g., query results), a format for data input to services (e.g., query format), and/or the like. In this manner, requests may be provided to services in a uniform manner, and data may be consumed from services in a uniform manner, regardless of how the services handle that data within the services themselves (and/or the datastores associated with the services). This solution may be more scalable than traditional solutions, for example, at least because the service provider interfaces may be maintained by their respective services and/or associated development teams. The multi-tenant system may provide requests and consume data in a uniform manner, without having to maintain a large "glue layer" that is implemented independent of the services. As more services are added, the same service provider interfaces may be deployed, and then implemented by the added services with minimal modification.

In some embodiments, the multi-tenant system includes an arbitrary query engine to query disparate services and/or disparate datastores in a manner that does not appear (e.g., to the user that initiated the user request) to be different from querying a monolithic datastore. For example, the user request supplied by the user to the arbitrary query engine may be the same request that the user can supply to a system that queries a monolithic datastore. In order to query disparate services and/or disparate datastores in such a manner, the arbitrary query engine may include query nodes, and each of the query nodes may be associated with a service connector node. The service connector nodes may allow the service provider interfaces of the various services to hook into the arbitrary query engine. Accordingly, the service connectors may be the arbitrary query engine's counterpart to the service provider interfaces of the services.

In some embodiments, a query node may handle a portion of a query. For example, a single query may relate to usage data and subscription data. The arbitrary query engine may partition the query into sub-queries, and send a usage sub-query (e.g., the portion of the query relating to usage data) to a first query node, and send a subscription sub-query (e.g., the portion of the query relating to subscription data) to a second query node. A usage service connector node may determine a usage service provider interface associated with the usage service, and then send the usage sub-query to the usage service provider interface for processing. A subscription connector node may determine a subscription service provider interface associated with the subscription service, and then send the usage sub-query to the usage service provider interface for processing. The service connector nodes may also handle the return output of the service provider interfaces. The arbitrary query engine may provide the results (e.g., the combined returned output) to the user.

In various embodiments, a computing system is configured to receive, by an arbitrary query user interface, a user request to perform a query associated with user data, wherein the user data includes first data and second data. Partition, by a coordinator node of an arbitrary query engine, the query into at least a first sub-query and a second sub-query. Assign, by the coordinator node of the arbitrary query engine, the first sub-query to a first query node of the arbitrary query engine. Identify, by a first service connector associated with the first query node of the arbitrary query engine, a first service provider interface (SPI) integrated into a first service, the first service being capable of processing the first sub-query, the first SPI being configured to operate on the first data in a first datastore associated with the first service, the first SPI including a common interface component configured to facilitate communication between the arbitrary query engine and the first SPI, and the first SPI including a first service interface component configured based on a uniform access specification. Provide, by the first service connector associated with the first query node of the arbitrary query engine, the first sub-query to the first service provider interface. Obtain, by the first service using the first SPI, at least a portion of the first data from the first datastore associated with the first service, the at least a portion of the first data being formatted according to a first service data specification. Transform, by the first SPI based on the uniform access specification, the at least a portion of the first data, thereby generating transformed first data formatted according to the uniform access specification. Provide, by the first service using the first SPI, the transformed first data to the arbitrary query engine In some embodiments, the systems, methods, and non-transitory computer readable media are further configured to assign, by the coordinator node of the arbitrary query engine, the second sub-query to a second query node of the arbitrary query engine. Select, by a second service connector associated with the second query node of the arbitrary query engine, a second service provider interface (SPI) integrated into a second service, the second service being capable of processing the second sub-query, the second SPI being configured to operate on the second data in a second datastore associated with the second service, the second SPI including a common interface component configured to facilitate communication between the arbitrary query engine and the second SPI, and the second SPI including a second service interface component configured based on a uniform access specification. Provide, by the second service connector associated with the second query node of the arbitrary query engine, the second sub-query to the second service provider interface. Obtain, by the second service using the first SPI, at least a portion of the first data from the second datastore associated with the second service, the at least a portion of the second data being formatted according to a second service data specification. Transform, by the second SPI based on the uniform access specification, the at least a portion of the second data, thereby generating transformed second data formatted according to the uniform access specification. Provide, by the second service using the first SPI, the transformed second data to the arbitrary query engine.

In some embodiments, the user data comprises tenant data, the first data comprises usage data, and the second data comprises subscription data.

In some embodiments, the first service comprises a usage service, and the second service comprises a subscription service.

In some embodiments, the first and second service connectors select the first and second service provider interfaces based on a file that is stored in each of the first and second service connectors, the file storing the locations of the first and second service provider interfaces.

In some embodiments, the first and second service connectors select the first and second service provider interfaces based on querying a third service for the locations of the first and second service provider interfaces, the third service maintaining the locations of the first and second service provider interfaces.

In some embodiments, any of the query and the first and second sub-queries comprise SQL queries.

In some embodiments, the first and second service connectors are integrated into the arbitrary query engine as one or more linked libraries.

In some embodiments, the providing, by the first service using the first SPI, the transformed first data, comprises streaming, by a common communication component of the first service using the first SPI, the transformed first data; and the providing, by the second service using the second SPI, the transformed second data, comprises streaming, by a common communication component of the second service using the first SPI, the transformed second data, the common communication component of the first service being the same as the common communication component of the second service.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Figure 1:
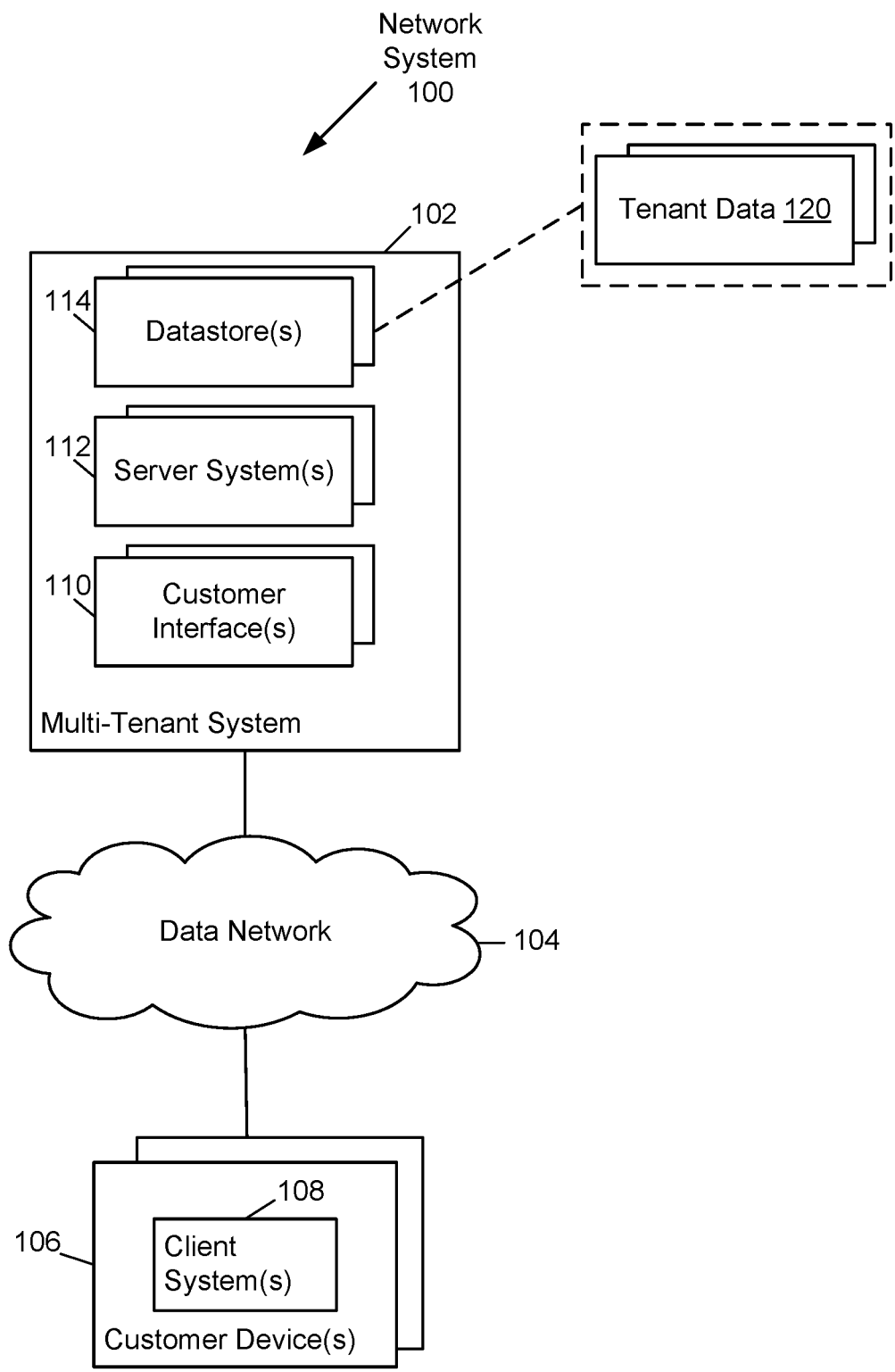
FIG. 1 depicts a diagram of an example network system for providing cloud-based software-as-a-service (SAAS) services of a multi-tenant system to multiple tenants according to some embodiments of the present invention.

A claimed solution rooted in computer technology overcomes problems specifically arising in the realm of computer technology. In various embodiments, a multi-tenant computing system (or, simply, multi-tenant system) is configured to receive a user request to perform a query. The user request may be a request initiated by a tenant (e.g., Verizon) of the multi-tenant system to obtain some or all of their tenant data. For example, the tenant data may include usage data stored in a usage datastore managed by a usage service of the multi-tenant system. The tenant data may also include subscription data stored in a subscription datastore managed by a subscription service of the multi-tenant system. The "services" described herein may be microservices, and/or the services may function and/or be defined differently. For example, the usage service may store and/or access data in one manner (e.g., as defined by a specification for the usage service), and the subscription service may store and/or access data in another manner (e.g., as defined by a specification for the subscription service). In order for the multi-tenant system to query the different services, and/or the datastores associated with those services, in a uniform manner, each of the services may include a service provider interface. In some embodiments, the multi-tenant system may provide the same service provider interface to each of the different services, and the service provider interfaces may only require minimal modification to function with a particular service. For example, the modification may include defining locations of datastores and/or data formats for the datastore (e.g., object-based, relational, flat-file). Accordingly, modifying the service provider interface for a particular service may only include adding or modifying two or three lines of code within the service provider interface. The remaining portions of the service provider interface may be common across all of the service provider interface for the various services of the multi-tenant system.

In some embodiments, each of the service provider interfaces may be defined by the multi-tenant system according to a uniform access specification. For example, the uniform access specification may define a format for data output from services (e.g., query results), a format for data input to services (e.g., query format), and/or the like. In this manner, requests may be provided to services in a uniform manner, and data may be consumed from services in a uniform manner, regardless of how the services handle that data within the services themselves (and/or the datastores associated with the services). This solution may be more scalable than traditional solutions, for example, at least because the service provider interfaces may be maintained by their respective services and/or associated development teams. The multi-tenant system may provide requests and consume data in a uniform manner, without having to maintain a large "glue layer" that is implemented independent of the services. As more services are added, the same service provider interfaces may be deployed, and then implemented by the added services with minimal modification.

In some embodiments, the multi-tenant system includes an arbitrary query engine to query disparate services and/or disparate datastores in a manner that does not appear (e.g., to the user that initiated the user request) to be different from querying a monolithic datastore. For example, the user request supplied by the user to the arbitrary query engine may be the same request that the user can supply to a system that queries a monolithic datastore. In order to query disparate services and/or disparate datastores in such a manner, the arbitrary query engine may include query nodes, and each of the query nodes may be associated with a service connector node. The service connector nodes may allow the service provider interfaces of the various services to hook into the arbitrary query engine. Accordingly, the service connectors may be the arbitrary query engine's counterpart to the service provider interfaces of the services.

In some embodiments, a query node may handle a portion of a query. For example, a single query may relate to usage data and subscription data. The arbitrary query engine may partition the query into sub-queries, and send a usage sub-query (e.g., the portion of the query relating to usage data) to a first query node, and send a subscription sub-query (e.g., the portion of the query relating to subscription data) to a second query node. A usage service connector node may determine a usage service provider interface associated with the usage service, and then send the usage sub-query to the usage service provider interface for processing. A subscription connector node may determine a subscription service provider interface associated with the subscription service, and then send the usage sub-query to the usage service provider interface for processing. The service connector nodes may also handle the return output of the service provider interfaces. The arbitrary query engine may provide the results (e.g., the combined returned output) to the user.

FIG. 1 depicts a diagram of an example network system 100 for providing cloud-based software-as-a-service (SAAS) services of a multi-tenant system 102 to multiple tenants according to some embodiments. Examples of the cloud-based SAAS services include data storage, data processing, and business-oriented applications. In some embodiments, each tenant may be a subscription-based entity or provider (e.g., an internet service provider, a home security system and service provider, a cellular phone service provider, or entertainment content provider). Each tenant may include a group of one or more users (e.g., individuals, business entities, customers of the business entities, systems) who share access to the cloud-based services. In one embodiment, a tenant includes a service entity such as AT&T, Netflix, Verizon, and/or the like. A tenant may include one or more products or services of an entity. For example, AT&T internet products may be a particular tenant, and AT&T security products may be another tenant. In some embodiments, the cloud-based SAAS services relate to managing subscriber records, product and/or service consumption information, billing information, payment information, and/or the like.

The network system 100 includes the multi-tenant system 102 coupled via a data network 104 (e.g., a set of one or more public and/or private, wired and/or wireless networks) to client devices 106. The multi-tenant system 102 includes shared resources to host the cloud-based SAAS services to the tenants. The shared resources may include processors, memory, virtual systems, services, application programs, load balancers, firewalls, and/or the like. As shown, the multi-tenant system 102 includes tenant interfaces 110, server systems 112, and datastores 114. Each of the client devices 106 includes a client system 108 that accesses the cloud-based SAAS services hosted by the multi-tenant system 102. In some embodiments, the client systems 108 may be operated by employees (e.g., administrator users) of the provider of the provider of the multi-tenant system 102. In some embodiments, the client systems 108 may be operated by employees of the tenant. In some embodiments, the client systems 108 may be operated by end users of the tenant's services.

Each client device 106 may include a desktop, laptop, notebook, tablet, personal digital assistant, smart phone, or other consumer electronic devices incorporating one or more computer components. The client system 108 on each client device 106 may include hardware, software and/or firmware for communicating with the multi-tenant system 102 and accessing the cloud-based services it hosts. Examples of the client systems 108 may include web browsers, client engines, drivers, user interface components, proprietary interfaces, and/or the like.

The multi-tenant system 102 includes hardware, software and/or firmware to host the cloud-based services for the tenants. It will be appreciated that the typical multi-tenant system 102 may offer access to shared resources including systems and applications on shared devices and offer each tenant the same quality or varying qualities of service. In some embodiments, the multi-tenant system 102 does not use virtualization or instantiation processes. In some embodiments, a multi-tenant system 102 integrates several business computing systems into a common system with a view toward streamlining business processes and increasing efficiencies on a business-wide level.

In some embodiments, the multi-tenant system 102 includes a user interface tier of multiple tenant interfaces 110, a server tier of multiple server systems 112, and a datastore tier of multiple datastores 114 for the multiple tenants. In some embodiments, the tenant interfaces 110 includes graphical user interfaces and/or web-based interfaces to enable tenants to access the shared services hosted by the multi-tenant system 102. The tenant interfaces 110 may support load balancing when multiple tenants (and/or multiple customers of the tenants) try to access the multi-tenant system 102 concurrently. The tenant interfaces 110 may additionally or alternatively include an operator interface for use by a systems operator to configure or otherwise manage the multi-tenant system 102. In some embodiments, each tenant may be associated with a subset of the total tenant interfaces 110 for load balancing.

In some embodiments, the server systems 112 include hardware, software and/or firmware to host the shared services for tenants. The hosted services may include tenant-specific business services or functions, including enterprise resource planning (ERP), customer relationship management (CRM), eCommerce, Human Resources (HR) management, payroll, financials, accounting, calendaring, order processing, subscription billing, inventory management, supply chain management (SCM), collaboration, sales force automation (SFA), marketing automation, contact list management, call-center support, web-based customer support, partner and vendor management systems, product lifecycle management (PLM), financial, reporting and analysis, and/or the like. Similar to the tenant interfaces 110, in some embodiments, the server systems 110 may support load balancing when multiple tenants (and/or multiple customers of tenants) try to access the multi-tenant system 102 concurrently. Further, in some embodiments, each tenant may be associated with a subset of the total server systems 112 for load balancing.

In some embodiments, tenant data 120 for each tenant may be stored in a logical store across one or more datastores 114. In some embodiments, each tenant uses a logical store that is not assigned to any predetermined datastores 114. Each logical store may contain tenant data 120 that is used, generated and/or stored as part of providing tenant-specific business services or functions. In some embodiments, the datastores 114 may include relational database management systems (RDBMS), object-based database systems, and/or the like. In some embodiments, tenant data 120 may be stored across multiple datastores 114, with each datastore dedicated to a particular service (e.g., managing customer records, managing product and/or service consumption information, managing billing information, managing payment information, and/or the like).

In some embodiments, the tenant data 120 may include subscription information, such as billing data and/or subscription status (e.g., active, canceled, suspended, re-activated). Billing data may include billing invoice data (e.g., date of invoices and invoice amounts, overage charge dates and overage charge amounts), payment transaction data (e.g., date of payments, amount of payments), payment methods (e.g., credit card, debit card), payment plan (e.g., annual billing, monthly billing), and/or service plan information (e.g., the name of a service plan). Subscription information may also include a geographic region and/or location associated with a tenant, service, and/or subscriber. In some embodiments, the tenant data 120 may include usage data (e.g., account activity data), such as new subscriptions, changes to subscribed products and/or services, cancellation of one or more products and/or services, subscriptions to new products and/or services, application of discounts, loyalty program package changes (e.g., additional programs and/or services, special rates, and/or the like for loyal customers), reduction or increase of rates for products and/or services, and/or cancellation of the application. In some embodiments, account activity may include usage of a product and/or product of a subscriber (e.g., what channels the subscriber actually watches, what services and what level of consumption the subscriber receives, quality of the product and/or services, and/or the like).

In some embodiments, the tenant data 120 may be stored in one or more data formats (or, simply, formats). For example, subscription tenant data may be stored in a particular format, and usage tenant data may be stored in another format. As used herein, formats may include data types, variable types, protocols (e.g., protocols for accessing, storing, and/or transmitting data), programming languages, scripting languages, data value parameters (e.g., date formats, string lengths), endpoint locations and/or types, and/or the like.

In some embodiments, the multi-tenant system 102 functions to provide uniform queries to disparate services (e.g., microservices) and/or disparate datastores. For example, different services of the multi-tenant system 102 may manage (e.g., create, read, update, delete) tenant data 120 stored in different datastores 114. It will be appreciated that as used herein, a "service" may be single service and/or a set of services (e.g., a cluster of services). The datastores 114 may store data in different formats, and/or the services may handle data differently. The services may each include a service provider interface (SPIs) that provides data from the service, and/or receives data (e.g., queries) at the service, in a common (or, uniform) format, regardless of the original format that may be used by the service and/or datastores 114. In some embodiments, the multi-tenant system 102 may define a uniform access specification that defines the common format that the services must comport with when receiving and/or providing data. For example, each service may include a service provider interface, and communication with the services may be performed through the service provider interfaces and corresponding connector services of the multi-tenant system 102. For example, the connector services may include the locations of the service provider interfaces and/or services. Accordingly, each of the services may be queried in a uniform manner, and query results may be consumed from the services in a uniform manner, regardless of the internal specifications and/or operations of the services and/or datastores.

The data network (or, communication network) 104 may represent one or more computer networks (e.g., LAN, WAN, or the like) or other transmission mediums. The data network 104 may provide communication between the systems, engines, datastores, components, and/or devices described herein. In some embodiments, the data network 104 includes one or more computing devices, routers, cables, buses, and/or other network topologies (e.g., mesh, and the like). In some embodiments, the data network 104 may be wired and/or wireless. In various embodiments, the data network 104 may include the Internet, one or more wide area networks (WANs) or local area networks (LANs), one or more networks that may be public, private, IP-based, non-IP based, and so forth.

Figure 2:
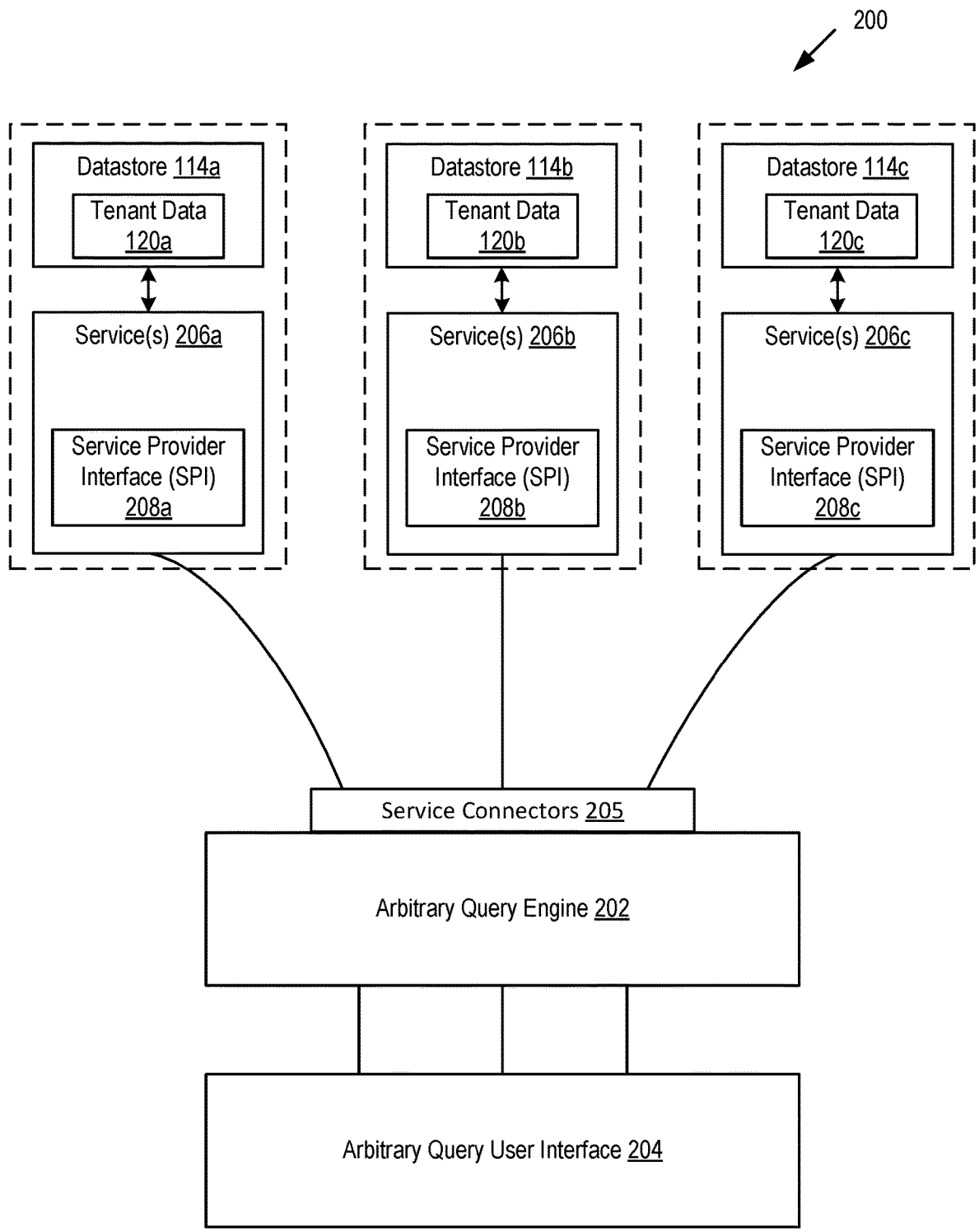
FIG. 2 depicts a diagram of an example portion of a multi-tenant system for managing arbitrary queries across distributed datastores according to some embodiments.

FIG. 2 depicts a diagram of an example portion 200 of a multi-tenant system 102 for managing arbitrary queries across distributed datastores according to some embodiments. In the example of FIG. 2, the example portion 200 of the multi-tenant system 102 includes an arbitrary query engine 202, an arbitrary query user interface 204, service connectors 205, services 206a to 206c (individually, the service 206, collectively, the services 206), service provider interfaces (SPIs) 208 (individually, the service provider interface 208, collectively, the service provider interfaces 208), and datastores 114a to 114c (individually, the datastore 114, collectively, the service provider datastores 114). The three datastores 114 may each be respectively managed by the three sets of one or more services 206, and each respectively made accessible in a uniform manner by the service provider interfaces (SPIs) 208. In some embodiments, the central controller engine 202, which may support internal or tenant communications, is coupled via network devices with the datastores 114. The network devices may include routers, load balancers, firewalls, and/or the like. Although only three services 206, three service provider interfaces 208, and three datastores 114 are shown here, it will be appreciated that the multi-tenant system 102 may support a greater or lesser number of such services 206, service provider interfaces 208, and/or datastores 114.

As discussed herein, the multi-tenant system 102 distributes tenant data 120 across multiple datastores 114 at multiple locations. As shown, the multi-tenant system distributes tenant data 120 across at least datastores 114a, 114b and 114c. The multi-tenant system 102 may include one or more services, shown as services 206a, 206b and 206c, to respectively manage the tenant data 120 at each datastore 114 through one or more application program interfaces (APIs). APIs are typically designed to be specific to the purpose of the service it supports and may differ widely in the exposed capabilities and performance. For example, in some systems, each of the different datastores 114 and each of the different services 206 may be developed independently of one another and possibly by different development teams. Accordingly, it is common that the API calls are non-uniform.

To solve the nonuniformity, the system could incorporate a "glue" layer, e.g., an enterprise service bus or a service-oriented architecture (SOA layer) that access data via the APIs and exposes it to the consumers. Glue layers typically access data directly from the datastore, bypassing the services with their different APIs. Glue layers have been found to be brittle, needing to be matched continuously to changing APIs that the services expose. Further, direct database access often violates data integrity guarantees or service level agreements that a service is trying to offer. Further, data exposed directly from the database often has a different shape than the data exposed at API level. Data exposed directly from the database therefore requires extensive transformation to match the data shape of that received at the API level. API enforcement through code or process is often inconsistent, which often results in multiple incompatible implementations. By putting these requirements on the software development process, the resulting APIs may only be "lowest common denominator" APIs instead of matching the desired use cases for the services.

To enable uniform access to the services 206 and the tenant data 120 stored in the datastores 114, in some embodiments, the multi-tenant system 102 includes a software component embedded directly (or, integrated) into the services 206. In other embodiments, the software component may be hooked into the services 206, as opposed to embedded directly into the services 206. This software component, referred to herein as a service provider interface (SPI) 208a, 208b and 208c respectively, may be delivered as a library to a service development team for integration into the services 206 to make their services compatible, without having to change their APIs or expose internal details of their database. With the service provider interface 208 integrated into the services 206, the multi-tenant system 102 enables access to diverse data services in a uniform manner without having to build extensive glue layers between services, the consumers, and/or other features of the multi-tenant system 102. Each of the services 206 may enable access to the diverse data services without exposing their internal data organization and/or without bypassing the services 206. Development teams can use the service provider interfaces 208 to allow access to the data exposed by the services 206 in a uniform manner, and also provide data in a uniform manner, regardless of the internal formats and specification used by the service.

By having multiple datastores 114 and multiple services 206 instead of a monolithic database, the multi-tenant system 102 may no longer be able to employ a common query layer (e.g., data source export) that can go back to the monolithic database. Accordingly, a solution is needed to enable arbitrary queries to be executed with minimal time delay against the tenant data 120 that is distributed across the multiple datastores 114. Notably, the tenant data 120 may include different business objects that can be queried separately or put into relationships (e.g., by "joins").

Some solutions may include time-delayed or continuous replication into a data warehouse, fixing the set of queries available, or custom coding. Time-delayed or continuous replication into a data warehouse introduces significant time delay that is typically unacceptable for many use cases. Further, data warehouses often organize data in different ways than the source system. Accordingly, substantial effort would be needed to deal with data organization. A fixed set of queries that can be executed limits the ability of customers to fetch data specific to their needs. Custom coding of query limitations on the types of queries possible (e.g., only one object type) is very labor intensive and does not scale for an organization with many customers with different needs. Each new query would take substantial time to develop, which would make ad-hoc querying impractical or impossible. Further, limitations on the types of queries (e.g., not supporting JOIN operations) would also limit the abilities of customers to fetch data specific to their needs.

In the example of FIG. 2, the multi-tenant system 102 uses the arbitrary query engine 202 to query (e.g., access) the service provider interfaces 208 of the services 206 using service connectors 205. The arbitrary query engine 202 may comprise a modified Presto analytics engine. The arbitrary query engine 202 may be configured to maintain the purpose of each of the services 206, the general location of data belonging to each tenant, and associations therebetween. Thus, for example, a user may submit a user request via the arbitrary query user interface 204 to perform a query. The arbitrary query engine 202 may generate an arbitrary query (or, simply, query) based on the user request, and use the arbitrary query and corresponding metadata (e.g., a tenant identifier) to assist the arbitrary query engine 202 in identifying the relevant datastores 114 and relevant services 206 capable of generating the data results to the query. The arbitrary query engine 202 is capable of issuing the service provider interface calls to the service provider interfaces of the respective services 206, which may be based on the user request. More specifically, the arbitrary query engine 202 includes service connectors 205 which connect the arbitrary query engine 202 to the service provider interfaces 208, the services 206 and/or the datastores 114, as discussed elsewhere herein.

In some embodiments, the multi-tenant system 102 leverages the ability of the arbitrary query engine 202 to execute arbitrary queries in a standard query language (e.g., SQL) against the tenant data 120 stored in the multiple datastores 114 and put it into relation in the same way that a monolithic data system would do. Exposing the tenant data through the service provider interfaces 208 and not as files on a file system (e.g., as HDFS or Hive would do) allows for integration of many different data services 206 and underlying storage technologies, thus enabling the multi-tenant system 102 to distribute tenant data 120 across many services 206 and still to provide a uniform presentation to customers for their needs. The arbitrary query engine 202 enables every query to access the service provider interfaces 208 directly and fetch the most current data from the services 206, and therefore to provide a view of the current tenant data 120 as of the moment of the query (unlike a replicated or data warehouse system, which could have stale data). Thus, data access is not time-delayed. Accordingly, arbitrary queries (e.g., as opposed to pre-defined queries) may be generated and provided to disparate service provider interfaces 208, services 208, and/or datastores 114.

Figure 3:
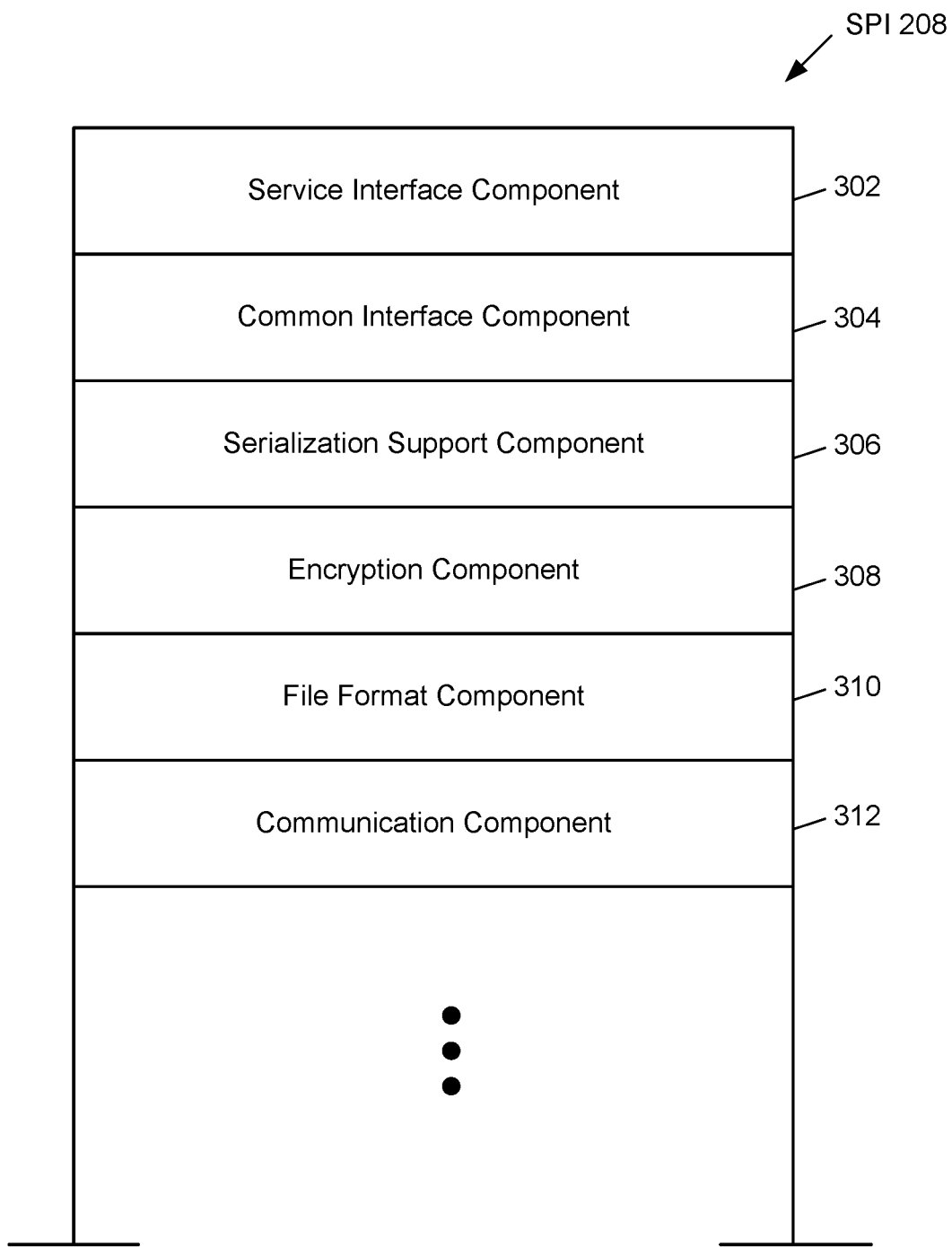
FIG. 3 depicts a diagram of an example service provider interface (SPI) according to some embodiments.

FIG. 3 depicts a diagram of an example service provider interface (SPI) 208 according to some embodiments. Generally, under some approaches (e.g., approaches that do not use service provider interfaces 208), services typically needed to receive information (e.g., queries and/or other service requests) in a format native to the particular service and/or associated datastores. Accordingly, information typically had to be provided in different formats for different services. Alternatively, under other approaches that also do not use service provider interfaces 208, the entity providing the request for information, and/or receiving a response to the request for information, had to translate the requests prior to sending the request, and/or translate the responses after they have been sent from the service. The service provider interface 208 may allow information to be provided (e.g., from the requesting entity) to different services in a common format (e.g., based on a uniform access specification and/or service data specifications of the services), and/or may allow information to be provided from the different services in a common format (e.g., based on a uniform access specification and/or service data specifications of the services).

In the example of FIG. 3, the service provider interface 208 includes a service interface component 302, a common interface component 304, a serialization support component 308, an encryption component 310, a file format component 312, and a communication component 314. The service interface component 302 may function to facilitate implementation of uniform access for a particular service 208. While the other components (e.g., components 304-312) of the service provider interface 208 may be common across all of the service provider interfaces 208, the service interface component 302 may be modified for the particular service 208. In some embodiments, services 208 may be implemented and/or managed by different development teams. For example, a usage service 208 may be managed by a usage development team, a subscription service 208 may be managed by a subscription development team, and so forth.

The different services 208 may adhere to different service data specifications. For example, a usage service 208 may store and/or access data according to a first format (e.g., data format, access protocols), and a subscription service 208 may store and/or access data according to another format (e.g., another data format, another access protocol). The service interface component 302 may provide the instructions for processing requests received in a common format, and/or providing responses to such requests in a common format. For example, the service interface component 302 may translate requests received according to a common format into a request that can be processed by a service that is formatted according to a specific data specification of that service. More specifically, for example, the common request may include variable for various parameters (e.g., access protocol types, data format types, endpoint locations, and/or the like), and the service interface component 302 may define the values for those variables.

In some embodiments, the service interface component 302 of a service provider interface may be deployed (e.g., to a particular service) with a template service interface component, which may be modified (e.g., by the particular service) based on the service data specification of the particular service.

The common interface component 304 may function to receive information (e.g., service requests) in a common format, and/or provide information (e.g., services request results) in a common format (e.g., to the central controller engine 202). As used herein, a query (or, arbitrary query) may be a type of service request. The common interface component 304 may be the same (e.g., having the same source code, object code, machine code, and/or the like) as the common interface components 304 of the other service provider interfaces 208 of the other services 206. In some embodiments, the common interface component 304 may comprise a REST interface. The common interface component 304 may be defined and/or function according to the uniform access specification.

The serialization support component 306 may function to provide serialization and/or deserialization support. The serialization support component 306 may include instructions (e.g., code) to convert one or more objects (e.g., one or more data records, between a sequence of bytes that can be sent through streams). The serialization support component 306 may be the same (e.g., having the same source code, object code, machine code, and/or the like) as the serialization support components 306 of the other service provider interfaces 208 of the other services 206, and may not require any modification (e.g., by the service development team) to function with the associated service 206. The serialization support component 306 may be defined and/or function according to the uniform access specification.

The encryption component 308 may function to encrypt communication with other elements in the multi-tenant system 102. For example, the encryption component 208 may encrypt data imported in the service provider interface 208 and/or data exported from the service provider interface 208. For example, a target location for exported data may require a particular encryption, and the encryption component 308 may ensure data is encrypted properly prior to exporting to the target location. The encryption component 308 may be the same (e.g., having the same source code, object code, machine code, and/or the like) as the encryption components 308 of the other service provider interfaces 208 of the other services 206, and may not require any modification (e.g., by the service development team) to function with the associated service 206. The encryption component 308 may be defined and/or function according to the uniform access specification.

The file format component 310 may function to facilitate data record formatting. For example, the file format component 310 may format data as JSON objects, CSV files, and/or custom types. The file format component 310 may be the same (e.g., having the same source code, object code, machine code, and/or the like) as the file format component 310 of the other service provider interfaces 208 of the other services 206, and may not require any modification (e.g., by the service development team) to function with the associated service 206. The file format component 310 may be defined and/or function according to the uniform access specification.

The communication component 312 may function to provide (e.g., stream, upload) data. For example, the communication component 312 may function to provide data to an S3 bucket. The communication component 312 may be the same (e.g., having the same source code, object code, machine code, and/or the like) as the communication components 312 of the other service provider interfaces 208 of the other services 206, and may not require any modification (e.g., by the service development team) to function with the associated service 206. The communication component 312 may be defined and/or function according to the uniform access specification.

Figure 4:
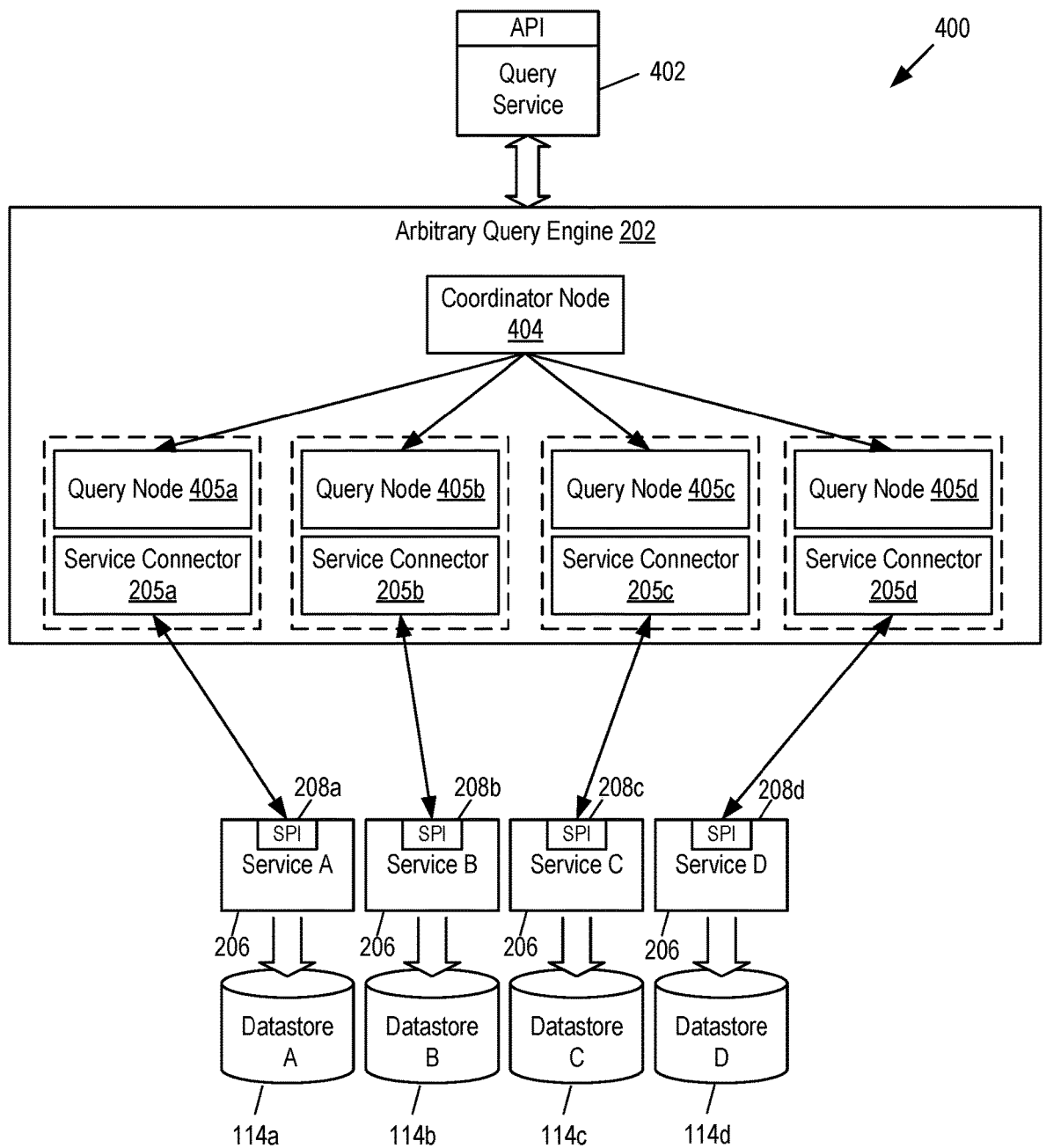
FIG. 4 depicts a diagram of example portion of a multi-tenant system for managing arbitrary queries across distributed datastores according to some embodiments

FIG. 4 depicts a diagram of example portion 400 of a multi-tenant system 102 for managing arbitrary queries across distributed datastores 114 according to some embodiments. In the example of FIG. 4, the example portion 400 of the multi-tenant system 102 includes datastores 114a to 114d (for services A, B, C and D respectively), each respectively managed by services 206a to 206d (for services A, B, C and D respectively), each respectively made accessible in a uniform manner by a service provider interface 208 (for services A, B, C and D respectively). A query service 402 is coupled via an arbitrary query engine 202 with the data stores 114. The query service 402 may receive user requests (e.g., input via arbitrary query user interface 204), and provide queries (e.g., SQL queries) to the arbitrary query engine 202. The query service 402 may also receive output from the arbitrary query engine 202 (e.g., query results), and then provide the query results to a user via the arbitrary query user interface 204. For example, the query service 402 may reformat the data according to the format of the original user request (e.g., a Verizon format).

In the example of FIG. 4, the arbitrary query engine 202 includes a coordinator node 404, query nodes 405a to 405d (individually, the query node 405, collectively, the query nodes 405), and service connectors 205 (individually, the service connector 205, collectively, the service connectors 205) to connect the arbitrary query engine 202 to the service provider interfaces 208, services 206, and/or the data stores 114.

The coordinator node 404 may function to receive user requests to perform queries (e.g., a particular type of service request) associated with user data. For example, the user request may be to perform a query for tenant data 120 associated with a particular subscriber (e.g., John Smith). The user data may include usage data, subscription data, and/or the like. The user request and/or the query may be received in a particular format (e.g., a propriety Verizon format).

The coordinator node 404 may function to partition the query into sub-queries. As discussed elsewhere herein, queries and/or sub-queries may be SQL queries. For example, the coordinator node 404 may partition queries into sub-queries based on the services 206 required to handle the query (e.g., a usage service 206, a subscription service 206). In some embodiments, the coordinator node 404 may function to assign sub-queries to query nodes 405. For example, the coordinator node 404 may assign sub-queries to query nodes 405 based on geographic location of the query nodes 405, load balancing, and/or the like.

The query nodes 405 may function to handle and/or process sub-queries, communicate with the coordinator node 404, and/or communication with an associated service connector 205. The service connectors 205 may function to identify and/or select service provider interface 208 for handling sub-queries at the service-level. For example, each service connector 205 may store a file including the locations (e.g., URIs) of the service provider interfaces 208. In another example, the service connectors 205 may query another service that maintains the locations of the locations of the service provider interfaces 208. The service connector 205 may store other metadata associated with the service provider interfaces 208 and/or services 206. For example, the service connectors 205 may store features and/or capabilities of the services 206 associated with the service provider interfaces 208. This may, for example, allow the service connectors 205 to select the best service provider interface 208 (and corresponding service 206) for handling various sub-queries. Like the service provider interfaces 208, the service connectors 205 may be configured according the uniform access specification. Accordingly, the service connectors 205 may provide queries in a common format to the service provider interfaces 208, and receive query results from the service provider interfaces 208 in a common format. The service connectors 205 may allow the arbitrary query engine 202 to provide queries (e.g., SQL queries) to the services 206 (e.g., via the service provider interfaces 208) as if the services 206 themselves were datastores (e.g., relational datastores).

In some embodiments, the service connectors 205 may each be the same. In other embodiments, some or all of the service connectors 205 may be different. For example, a particular set of query nodes 405 may be associated with a particular set of services 206, and the service connectors 205 for that particular set of query nodes 405 may include information associated with the service provider interfaces 208 of the particular set of services 206.

Figure 5A:
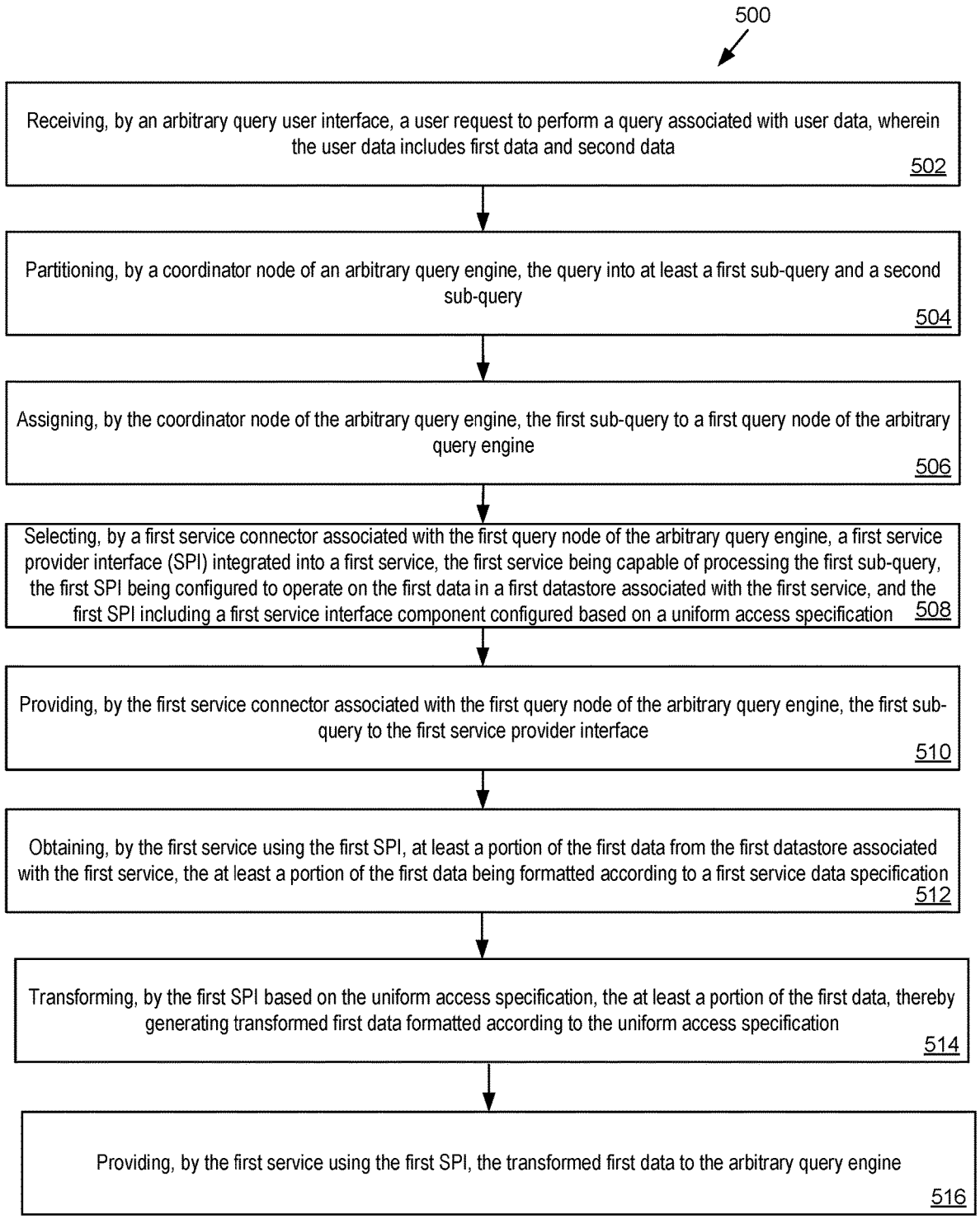
FIGS. 5A-B depict a flowchart of an example of a method of querying distributed datastores according to some embodiments.
Figure 5B:
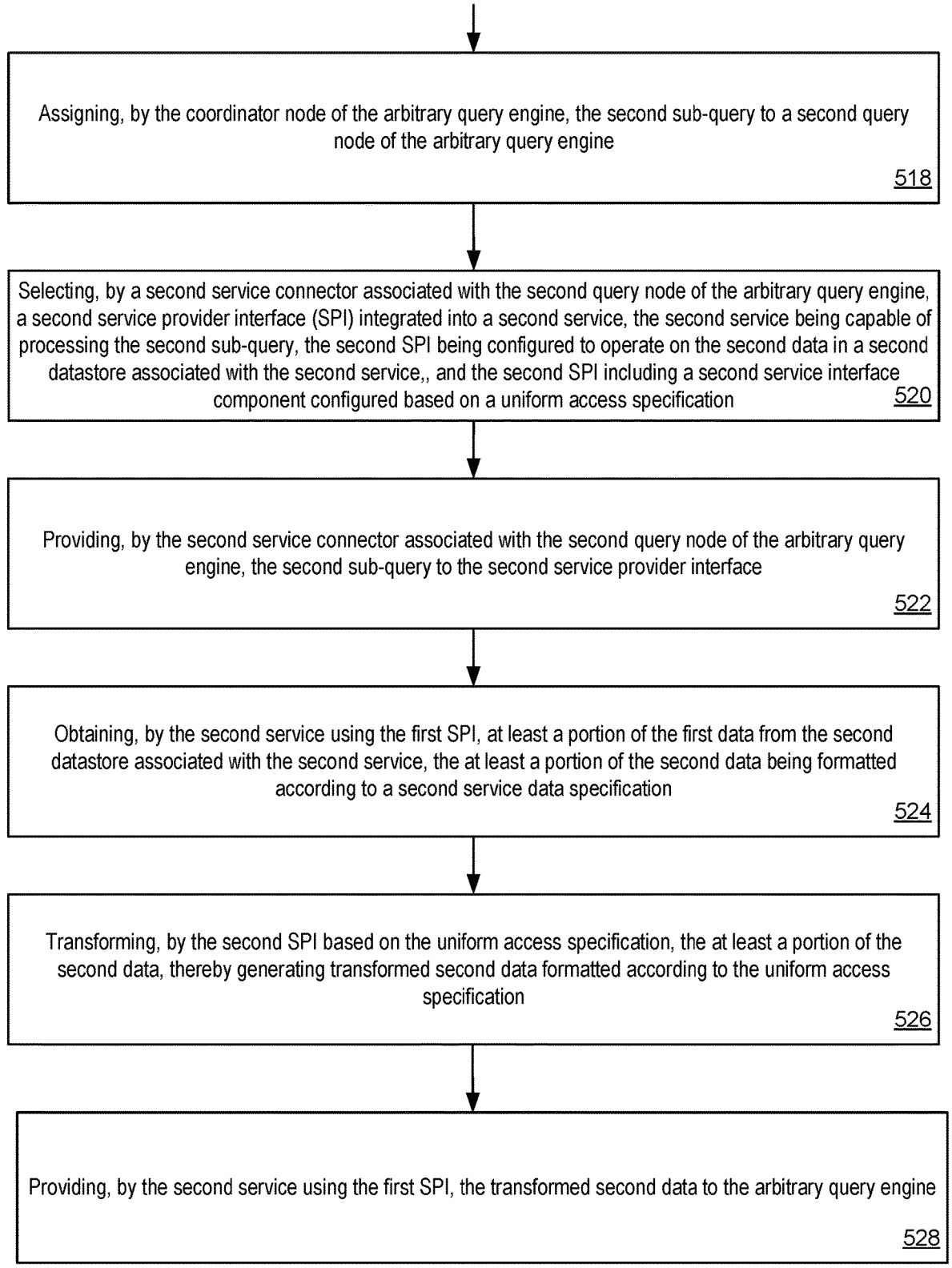

FIGS. 5A-B depict a flowchart of an example of a method 500 of querying distributed datastores according to some embodiments. In this and other flowcharts and/or sequence diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 502, a multi-tenant system (e.g., multi-tenant system 102) receives a user request to perform a query (e.g., a particular type of service request) associated with user data. For example, the user request may be to perform query for tenant data (e.g., tenant data 120) associated with a particular subscriber (e.g., John Smith). The user data may include first data (e.g., usage data) and second data (e.g., subscription data). The user request and/or query may be received in a first format (e.g., a propriety format). In some embodiments, an arbitrary query user interface (e.g., arbitrary query user interface 204) and/or an arbitrary query engine (e.g., arbitrary query engine 202) receives the query.

In step 504, the multi-tenant system partitions the query into at least a first sub-query and a second sub-query. Queries and/or sub-queries may be SQL queries. In some embodiments, a coordinator node (e.g., coordinator node 404) of the arbitrary query engine partitions the query.

In step 506, the multi-tenant system assigns the first sub-query to a first query node (e.g., query node 405a) of the arbitrary query engine. In some embodiments, the coordinator node assigns the first sub-query to the first query node. In some embodiments, the coordinator node may assign sub-queries based on load-balancing and/or geographic location of the query nodes.

In step 508, the multi-tenant system selects a first service provider interface (e.g., service provider interface 208a) integrated into a first service (e.g., service 206a). For example, the first service may be a usage service. The first service may be capable of processing the first sub-query, and the first SPI may be configured to operate on the first data in a first datastore (e.g., datastore 114a) associated with the first service. The first SPI may include a common interface component (e.g., common interface component 304) configured to facilitate communication between the arbitrary query engine and the first SPI, and the first SPI may include a first service interface component (e.g., first service interface component 302) configured based on a uniform access specification and/or a first data specification of the first service. In some embodiments, a first service connector (e.g., service connector 406a) of the arbitrary query engine selects the first service provider interface.

In step 510, the multi-tenant system provides the first sub-query to the first service provider interface. In some embodiments, the first service interface component provides the first sub-query to the first service provider interface. In some embodiments, the first service interface component provides (e.g., generates, transmits) a service request to the first service provider interface based on the first sub-query. For example, the first service interface component may generate a service request in a second format (e.g., a common format) from the sub-query. The first service interface component may transmit the service request to the common interface component of the first service provider interface.

In step 512, the multi-tenant system obtains at least a portion of the first data from the first datastore associated with the first service. The at least a portion of the first data may be formatted according to a first service data specification of the first service. In some embodiments, the first service may use the first service provider interface to obtain the data from the first datastore.

In step 514, the multi-tenant system transforms the at least a portion of the first data, thereby generating transformed first data formatted according to the uniform access specification. In some embodiments, one or more components of the first service provider interface transforms the data, such as the service interface component, an encryption component (e.g., encryption component 308), a serialization support component (e.g., serialization support component 304), and/or a file format component (e.g., file format component 310). In some embodiments, the data is transformed based on the uniform access specification.

In step 516, the multi-tenant system provides the transformed first data to the arbitrary query engine. For example, the first service interface component of the arbitrary query engine may receive the transformed first data. In some embodiments, a common communication component (e.g., communication component 312) of the first service provider interface provides the transformed data to arbitrary query engine.

In step 518, the multi-tenant system assigns the second sub-query to a second query node (e.g., query node 405b) of the arbitrary query engine. In some embodiments, the coordinator node assigns the second sub-query to the second query node.

In step 520, the multi-tenant system selects a second service provider interface (e.g., service provider interface 208b) integrated into a second service (e.g., service 206b). The second service may be a subscription service. The second service may be capable of processing the second sub-query, and the second SPI may be configured to operate on the second data in a second datastore (e.g., datastore 114b) associated with the second service. The second service provider interface may include a common interface component (e.g., the same common interface component that is used in the first service provider interface) configured to facilitate communication between the arbitrary query engine and the second service provider interface. The second service provider interface may include a second service interface component (e.g., an service interface component 302, albeit as modified for the second service) configured based on a uniform access specification and/or second data specification of the second service. In some embodiments, a second service connector (e.g., service connector 406b) of the arbitrary query engine selects the second service provider interface.

In some embodiments, the first and second service connectors select the first and second service provider interfaces based on a file that is stored in each of the first and second service connectors. The file may, for example, store the locations of the first and second service provider interfaces (and other locations of other service provider interfaces of the multi-tenant system).

In some embodiments, the first and second service connectors select the first and second service provider interfaces based on querying a third service for the locations of the first and second service provider interfaces, the third service maintaining the locations of the first and second service provider interfaces.

In step 522, the multi-tenant system provides the second sub-query to the second service provider interface. In some embodiments, the second service connector provides the second sub-query to the second service provider interface. For example, the second service connector may generate a second service request in a second format (e.g., a common format) from the second sub-query. The second service connector may transmit the second service request to the common interface component of the second service provider interface.

In step 524, the multi-tenant system obtains at least a portion of the second data from the second datastore associated with the second service. The at least a portion of the second data may be formatted according to a second service data specification. In some embodiments, the second service obtains the second data using the second service provider interface.

In step 526, the multi-tenant system transforms the at least a portion of the second data, thereby generating transformed second data formatted according to the uniform access specification. In some embodiments, one or more components of the second service provider interface transforms the second data, such as the service interface component of the second service provider interface, an encryption component (e.g., encryption component 308) of the second service provider interface, a serialization support component (e.g., serialization support component 304) of the second service provider interface, and/or a file format component (e.g., file format component 310) of the second service provider interface. In some embodiments, the data is transformed based on the uniform access specification.

In step 528, the multi-tenant system provides the transformed second data to the arbitrary query engine. In some embodiments, a common communication component (e.g., communication component 312) of the second service provider interface provides the transformed data to the second service connector of the arbitrary query engine.

Figure 6:
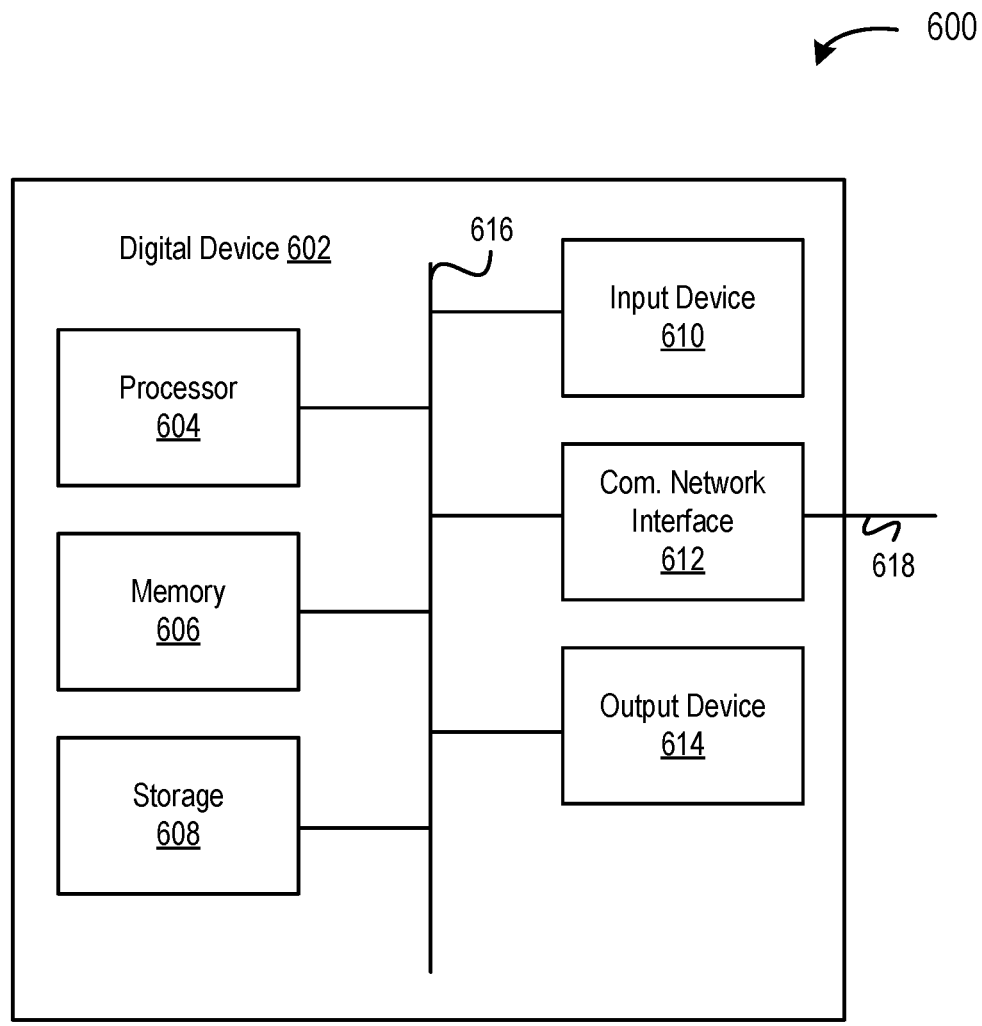
FIG. 6 is a diagram of an example computer system for implementing the features disclosed herein according to some embodiments.

FIG. 6 depicts a diagram 600 of an example of a computing device 602. Any of the systems, engines, datastores, and/or networks described herein may comprise an instance of one or more computing devices 602. In some embodiments, functionality of the computing device 602 is improved to the perform some or all of the functionality described herein. The computing device 602 comprises a processor 604, memory 606, storage 608, an input device 610, a communication network interface 612, and an output device 614 communicatively coupled to a communication channel 616. The processor 604 is configured to execute executable instructions (e.g., programs). In some embodiments, the processor 604 comprises circuitry or any processor capable of processing the executable instructions.

The memory 606 stores data. Some examples of memory 606 include storage devices, such as RAM, ROM, RAM cache, virtual memory, etc. In various embodiments, working data is stored within the memory 606. The data within the memory 606 may be cleared or ultimately transferred to the storage 608.

The storage 608 includes any storage configured to retrieve and store data. Some examples of the storage 608 include flash drives, hard drives, optical drives, cloud storage, and/or magnetic tape. Each of the memory system 606 and the storage system 608 comprises a computer-readable medium, which stores instructions or programs executable by processor 604.

The input device 610 is any device that inputs data (e.g., mouse and keyboard). The output device 614 outputs data (e.g., a speaker or display). It will be appreciated that the storage 608, input device 610, and output device 614 may be optional. For example, the routers/switchers may comprise the processor 604 and memory 606 as well as a device to receive and output data (e.g., the communication network interface 612 and/or the output device 614).

The communication network interface 612 may be coupled to a network (e.g., network 108) via the link 618. The communication network interface 612 may support communication over an Ethernet connection, a serial connection, a parallel connection, and/or an ATA connection. The communication network interface 612 may also support wireless communication (e.g., 802.11 a/b/g/n, WiMax, LTE, WiFi). It will be apparent that the communication network interface 612 may support many wired and wireless standards.

It will be appreciated that the hardware elements of the computing device 602 are not limited to those depicted in FIG. 6. A computing device 602 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 604 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A computing system comprising:
one or more processors; and
memory storing instructions that, when executed by the one or more processors, cause the computing system to perform:
receiving, by an arbitrary query user interface, a user request to perform a query associated with user data, the user data including first data and second data;
partitioning, by a coordinator node of an arbitrary query engine, the query into at least a first sub-query and a second sub-query;
assigning, by the coordinator node of the arbitrary query engine, the first sub-query to a first query node of the arbitrary query engine;
providing, by a first service connector associated with the first query node of the arbitrary query engine, the first sub-query to a first service provider interface (SPI) integrated into a first service, the first service being capable of processing the first sub-query, the first SPI being configured to operate on the first data in a first datastore associated with the first service, the first SPI including a common interface component configured based on a uniform access specification to facilitate external communication between the arbitrary query engine and the first SPI, and the first SPI including a first service interface component configured to transform between the uniform access specification and a first service data specification and to facilitate internal data management of the first service using the first service data specification;
obtaining, by the first service using the first SPI, at least a portion of the first data from the first datastore associated with the first service, the at least a portion of the first data being formatted according to the first service data specification;
transforming, by the first SPI based on the uniform access specification, the at least a portion of the first data, thereby generating transformed first data formatted according to the uniform access specification;
providing, by the first service using the first SPI, the transformed first data to the arbitrary query engine;
assigning, by the coordinator node of the arbitrary query engine, the second sub-query to a second query node of the arbitrary query engine;
providing, by a second service connector associated with the second query node of the arbitrary query engine, the second sub-query to a second service provider interface (SPI) integrated into a second service, the second service being capable of processing the second sub-query, the second SPI being configured to operate on the second data in a second datastore associated with the second service, the second SPI including a common interface component configured based on the uniform access specification to facilitate external communication between the arbitrary query engine and the second SPI, and the second SPI including a second service interface component configured to transform between the uniform access specification and a second service data specification and to facilitate internal data management of the second service using the second service data specification;
obtaining, by the second service using the second SPI, at least a portion of the second data from the second datastore associated with the second service, the at least a portion of the second data being formatted according to the second service data specification;
transforming, by the second SPI based on the uniform access specification, the at least a portion of the second data, thereby generating transformed second data formatted according to the uniform access specification; and
providing, by the second service using the second SPI, the transformed second data to the arbitrary query engine.

2. The system of claim 1, wherein the user data comprises tenant data, the first data comprises usage data, and the second data comprises subscription data.

3. The system of claim 1, wherein the first service comprises a usage service, and the second service comprises a subscription service.

4. The system of claim 1, wherein the first and second service connectors select the first and second service provider interfaces based on a file that is stored in each of the first and second service connectors, the file storing the locations of the first and second service provider interfaces.

5. The system of claim 1, wherein the first and second service connectors select the first and second service provider interfaces based on querying a third service for the locations of the first and second service provider interfaces, the third service maintaining the locations of the first and second service provider interfaces.

6. The system of claim 1, wherein the query comprises an SQL query.

7. The system of claim 1, wherein the first and second service connectors are integrated into the arbitrary query engine as one or more linked libraries.

8. The system of claim 1,
wherein the providing, by the first service using the first SPI, the transformed first data, comprises streaming, by a common communication component of the first service using the first SPI, the transformed first data; and
wherein the providing, by the second service using the second SPI, the transformed second data, comprises streaming, by a common communication component of the second service using the second SPI, the transformed second data, the common communication component of the first service being the same as the common communication component of the second service.

9. A method being implemented by a computing system including one or more physical processors and storage media storing machine-readable instructions, the method comprising:
receiving, by an arbitrary query user interface, a user request to perform a query associated with user data, the user data including first data and second data;
partitioning, by a coordinator node of an arbitrary query engine, the query into at least a first sub-query and a second sub-query;
assigning, by the coordinator node of the arbitrary query engine, the first sub-query to a first query node of the arbitrary query engine;
providing, by a first service connector associated with the first query node of the arbitrary query engine, the first sub-query to a first service provider interface (SPI) integrated into a first service, the first service being capable of processing the first sub-query, the first SPI being configured to operate on the first data in a first datastore associated with the first service, the first SPI including a common interface component configured based on a uniform access specification to facilitate external communication between the arbitrary query engine and the first SPI, and the first SPI including a first service interface component configured to transform between the uniform access specification and a first service data specification and to facilitate internal data management of the first service using the first service data specification;

obtaining, by the first service using the first SPI, at least a portion of the first data from the first datastore associated with the first service, the at least a portion of the first data being formatted according to the first service data specification;

transforming, by the first SPI based on the uniform access specification, the at least a portion of the first data, thereby generating transformed first data formatted according to the uniform access specification;

providing, by the first service using the first SPI, the transformed first data to the arbitrary query engine;

assigning, by the coordinator node of the arbitrary query engine, the second sub-query to a second query node of the arbitrary query engine;

providing, by a second service connector associated with the second query node of the arbitrary query engine, the second sub-query to a second service provider interface (SPI) integrated into a second service, the second service being capable of processing the second sub-query, the second SPI being configured to operate on the second data in a second datastore associated with the second service, the second SPI including a common interface component configured based on the uniform access specification to facilitate external communication between the arbitrary query engine and the second SPI, and the second SPI including a second service interface component configured to transform between the uniform access specification and a second service data specification and to facilitate internal data management of the second service using the second service data specification;

obtaining, by the second service using the second SPI, at least a portion of the second data from the second datastore associated with the second service, the at least a portion of the second data being formatted according to the second service data specification;

transforming, by the second SPI based on the uniform access specification, the at least a portion of the second data, thereby generating transformed second data formatted according to the uniform access specification; and providing, by the second service using the second SPI, the transformed second data to the arbitrary query engine.

10. The method of claim 9, wherein the user data comprises tenant data, the first data comprises usage data, and the second data comprises subscription data.

11. The method of claim 9, wherein the first service comprises a usage service, and the second service comprises a subscription service.

12. The method of claim 9, wherein the first and second service connectors select the first and second service provider interfaces based on a file that is stored in each of the first and second service connectors, the file storing the locations of the first and second service provider interfaces.

13. The method of claim 9, wherein the first and second service connectors select the first and second service provider interfaces based on querying a third service for the locations of the first and second service provider interfaces, the third service maintaining the locations of the first and second service provider interfaces.

14. The method of claim 9, wherein the query comprises an SQL query.

15. The method of claim 9, wherein the first and second service connectors are integrated into the arbitrary query engine as one or more linked libraries.

16. The method of claim 9,
wherein the providing, by the first service using the first SPI, the transformed first data, comprises streaming, by a common communication component of the first service using the first SPI, the transformed first data; and
wherein the providing, by the second service using the second SPI, the transformed second data, comprises streaming, by a common communication component of the second service using the second SPI, the transformed second data, the common communication component of the first service being the same as the common communication component of the second service.

17. A non-transitory computer readable medium comprising instructions that, when executed, cause one or more processors to perform:

receiving, by an arbitrary query user interface, a user request to perform a query associated with user data, the user data including first data and second data;

partitioning, by a coordinator node of an arbitrary query engine, the query into at least a first sub-query and a second sub-query;

assigning, by the coordinator node of the arbitrary query engine, the first sub-query to a first query node of the arbitrary query engine;

providing, by a first service connector associated with the first query node of the arbitrary query engine, the first sub-query to a first service provider interface (SPI) integrated into a first service, the first service being capable of processing the first sub-query, the first SPI being configured to operate on the first data in a first datastore associated with the first service, the first SPI including a common interface component configured based on a uniform access specification to facilitate external communication between the arbitrary query engine and the first SPI, and the first SPI including a first service interface component configured to transform between the uniform access specification and a first service data specification and to facilitate internal data management of the first service using the first service data specification;

obtaining, by the first service using the first SPI, at least a portion of the first data from the first datastore associated with the first service, the at least a portion of the first data being formatted according to the first service data specification;

transforming, by the first SPI based on the uniform access specification, the at least a portion of the first data, thereby generating transformed first data formatted according to the uniform access specification;

providing, by the first service using the first SPI, the transformed first data to the arbitrary query engine;

assigning, by the coordinator node of the arbitrary query engine, the second sub-query to a second query node of the arbitrary query engine;

providing, by a second service connector associated with the second query node of the arbitrary query engine, the second sub-query to a second service provider interface (SPI) integrated into a second service, the second service being capable of processing the second sub-query, the second SPI being configured to operate on the second data in a second datastore associated with the second service, the second SPI including a common interface component configured based on the uniform access specification to facilitate external communication between the arbitrary query engine and the second SPI, and the second SPI including a second service interface component configured to transform between the uniform access specification and a second service data specification and to facilitate internal data management of the second service using the second service data specification;

obtaining, by the second service using the second SPI, at least a portion of the second data from the second datastore associated with the second service, the at least a portion of the second data being formatted according to the second service data specification;

transforming, by the second SPI based on the uniform access specification, the at least a portion of the second data, thereby generating transformed second data formatted according to the uniform access specification; and providing, by the second service using the second SPI, the transformed second data to the arbitrary query engine.

* * * * *